Figure 1:
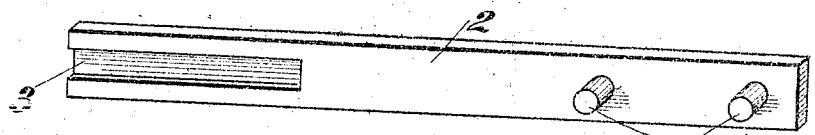

J. E. DUBÉ.
RAZOR BLADE HOLDER.
APPLICATION FILED MAY 17, 1909.

971,257.

Patented Sept. 27, 1910.

Witnesses:
S. A. Gauvin
E. Toupin

JOSEPH EDMOND DUBÉ
Inventor,

By Marion & Marion
Attorneys

UNITED STATES PATENT OFFICE.

JOSEPH EDMOND DUBÉ, OF QUEBEC, QUEBEC, CANADA.

RAZOR-BLADE HOLDER.

971,257.　　　　　Specification of Letters Patent.　Patented Sept. 27, 1910.

Application filed May 17, 1909. Serial No. 496,667.

*To all whom it may concern:*

Be it known that I, JOSEPH EDMOND DUBÉ, a subject of the King of Great Britain, residing at the city of Quebec, county of Quebec, in the Province of Quebec, Canada, have invented certain new and useful Improvements in Razor-Blade Holders; and I do hereby declare that the following is a full, clear, and exact description of the invention, such as will enable others skilled in the art to which it appertains to make and use the same.

The invention to be hereinafter described relates to razors, and particularly to a blade holder therefor.

Broadly speaking, it comprises a tubular handle and reversible clamping plates adapted to be partially inserted in the tubular handle.

In order to more clearly disclose the construction, operation and use of the invention, reference should be had to the accompanying drawing forming part of the present application.

Thoroughout the several figures of the drawings, like reference characters designate the same parts.

Figure 2:
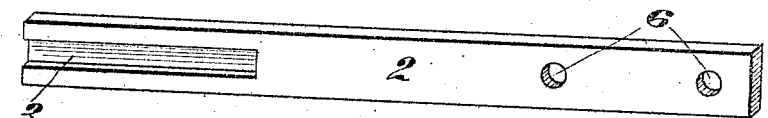
Figure 3:
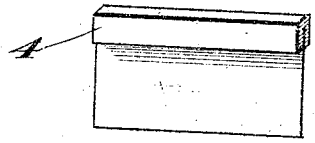
Figure 4:
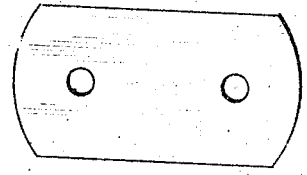
Figure 5:
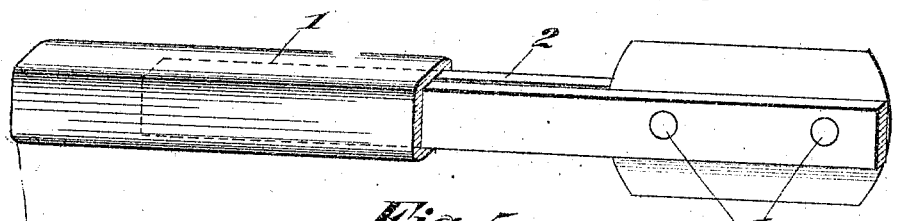
Figure 6:
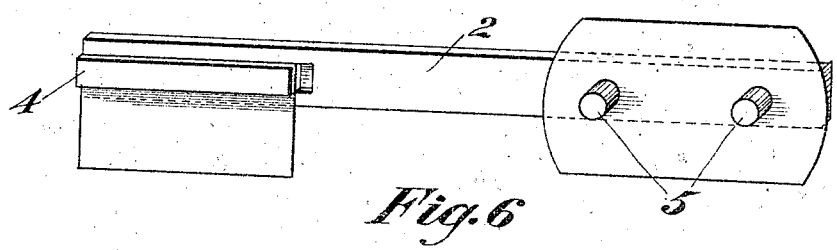

In the drawings: Figure 1 is a front view of the inside of one of the clamping plates; Fig. 2 is a similar view of the coöperating plate; Fig. 3 is an elevation of one form of removable blade; Fig. 4 is a similar view of a second form of removable blade; Fig. 5 is a side elevation of the device complete; and, Fig. 6 is a side elevation of one of the plates, showing both form of blades in operative position.

Referring to the drawings in detail, 1 indicates a tubular handle adapted to snugly receive the ends of the two coöperating clamping plates 2, between which the removable blades are held. It will be noticed that the inner faces of the plates have longitudinal grooves 3 running inward from one end. These grooves receive the sides of a blade body 4, and so hold the same solidly and firmly seated in operative position. The opposite end of one of these blades is provided with pins 5 on its inner face adapted to pass through perforations in a second form, or wafer blade, and be seated in openings 6 in the coöperating plate.

According to this construction, either one of two forms of blades may be used with equal ease, rendering the holder of double service. The two plates 2 are of such dimensions as to make just a tight fit when forced into the tubular handle. If desired, they may be tapered very slightly to coöperate with a slight internal taper of the tubular handle, giving a tight wedging action.

It is thought that the operation and use of the invention will be clear from the preceding detailed description.

Changes may be made in the arrangement and construction of the several parts of the invention, without in any way departing from the field and scope of the same, and it is meant to include all such within this application, wherein only a preferred form has been disclosed.

Having thus fully described my invention, what I claim as new, and desire to secure by Letters Patent, is:—

A device of the character described, comprising a tubular handle, and reversible coöperating clamping plates adapted to be forced into said handle, each of said plates being provided with a longitudinal groove in the inner face of one end and one of said plates being provided at its opposite end with pins adapted to be seated in holes or openings in the adjacent end of the coöperating plate.

In witness whereof I have hereunto set my hand in the presence of two witnesses.

JOSEPH EDMOND DUBÉ.

Witnesses:
　J. F. MONTAINE,
　H. LEABRÈQUE.